(12) United States Patent
Harris et al.

(10) Patent No.: US 7,082,712 B2
(45) Date of Patent: Aug. 1, 2006

(54) ARTHROPOD CONTAINMENT TRAP

(76) Inventors: David Harris, CMD Products, 1410 Flightliine Dr., Suite D, Lincoln, CA (US) 95648; Roy Bridges, CMD Products, 1410 Flightline Dr., Suite D, Lincoln, CA (US) 95648; Agenor Mafra-Neto, P.O. Box 5266, Riverside, CA (US) 92517

( * ) Notice: Subject to any disclaimer, the term of this patent is extended or adjusted under 35 U.S.C. 154(b) by 0 days.

(21) Appl. No.: 10/228,606

(22) Filed: Aug. 27, 2002

(65) Prior Publication Data

US 2004/0040198 A1    Mar. 4, 2004

(51) Int. Cl.
   *A01M 1/10*    (2006.01)
(52) U.S. Cl. ......................... 43/122; 43/107
(58) Field of Classification Search ................ 43/107, 43/122, 132.1
   See application file for complete search history.

(56) References Cited

U.S. PATENT DOCUMENTS

| | | | | |
|---|---|---|---|---|
| 141,346 A | * | 7/1873 | Hannah | 43/69 |
| 145,791 A | * | 12/1873 | Eichholtz | 43/118 |
| 419,003 A | * | 1/1890 | Brunwasser et al. | 43/122 |
| 544,183 A | * | 8/1895 | Marchese | 43/121 |
| D42,298 S | * | 3/1912 | Rainey | D22/122 |
| 1,191,179 A | * | 7/1916 | Hasselgren | 43/107 |
| 1,611,515 A | * | 12/1926 | Crown | 43/107 |
| 1,783,631 A | * | 12/1930 | Sladky | 43/107 |
| 2,478,104 A | | 8/1949 | Johnson | |
| 4,218,842 A | * | 8/1980 | Anderson | 43/122 |
| 4,501,088 A | * | 2/1985 | Boisvert et al. | 43/118 |
| 4,549,693 A | * | 10/1985 | Barlics | 239/58 |
| 4,551,941 A | | 11/1985 | Schneidmiller | |
| 4,592,163 A | | 6/1986 | Wilson | |
| 4,642,936 A | * | 2/1987 | Jobin et al. | 43/122 |
| 4,694,604 A | * | 9/1987 | Mitchell | 43/114 |
| 4,718,193 A | | 1/1988 | Rosselli | |
| 4,986,024 A | * | 1/1991 | Peek et al. | 43/107 |
| 5,392,560 A | * | 2/1995 | Donahue et al. | 43/122 |
| 5,452,540 A | | 9/1995 | Dowd et al. | |
| 5,522,171 A | * | 6/1996 | Mandeville | 43/122 |
| 5,647,164 A | * | 7/1997 | Yates | 43/139 |
| 5,842,305 A | | 12/1998 | Liao | |
| 5,918,410 A | * | 7/1999 | Knuppel | 43/131 |
| 6,189,259 B1 | * | 2/2001 | Soller | 43/131 |
| 6,216,383 B1 | * | 4/2001 | Klabunde et al. | 43/121 |
| 6,425,202 B1 | * | 7/2002 | Lin et al. | 43/107 |
| 6,532,695 B1 | * | 3/2003 | Alvarado | 43/122 |
| 6,543,182 B1 | * | 4/2003 | Snell et al. | 43/132.1 |

FOREIGN PATENT DOCUMENTS

WO    WO 9409624 A1  *  5/1994

* cited by examiner

*Primary Examiner*—Michael J. Carone
*Assistant Examiner*—Bret Hayes
(74) *Attorney, Agent, or Firm*—Matthew J. Temmerman; Daniel P. Maguire

(57) ABSTRACT

The present invention is an arthropod trap including a housing and containment chamber. The housing includes external openings, an overhang, and an internal tube and plate with entry ports. Attracted by bait in the containment chamber, arthropods fly in through the external openings, and then travel through the entry ports in the plate into the containment chamber. Alternatively, arthropods can directly enter the containment chamber through optional entry ports. The containment chamber can be a box or other rigid container, or a bag. This trap can be used to contain or monitor the populations of many different types of flying arthropods, including but not limited to flies, wasps, and yellow jackets.

21 Claims, 10 Drawing Sheets

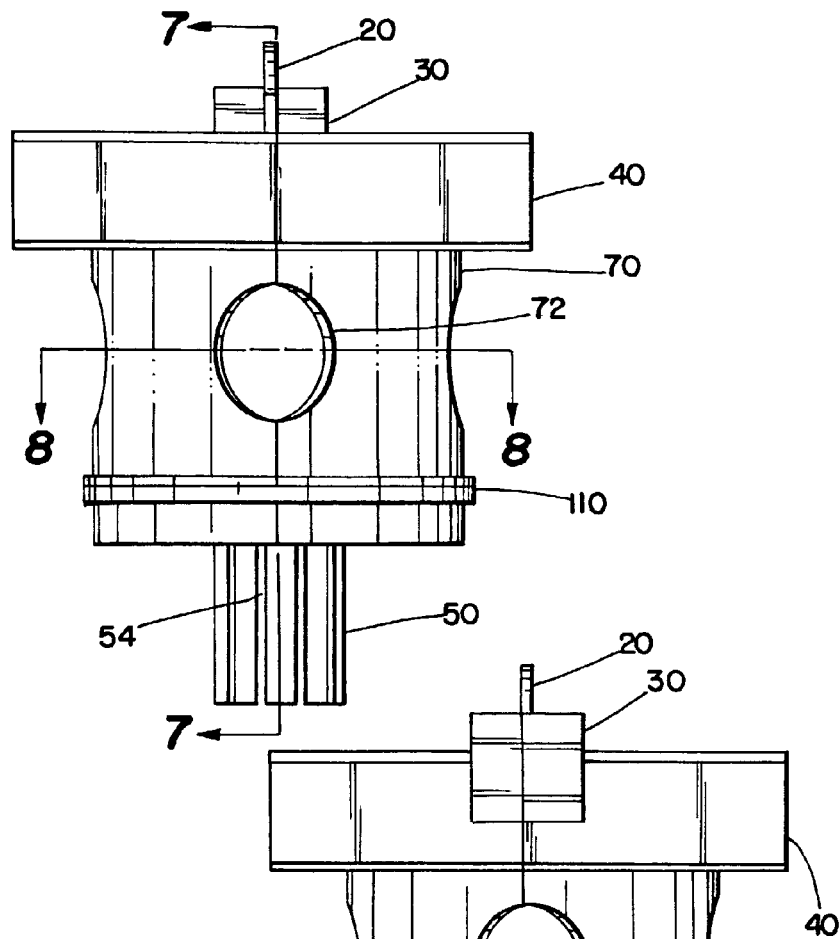
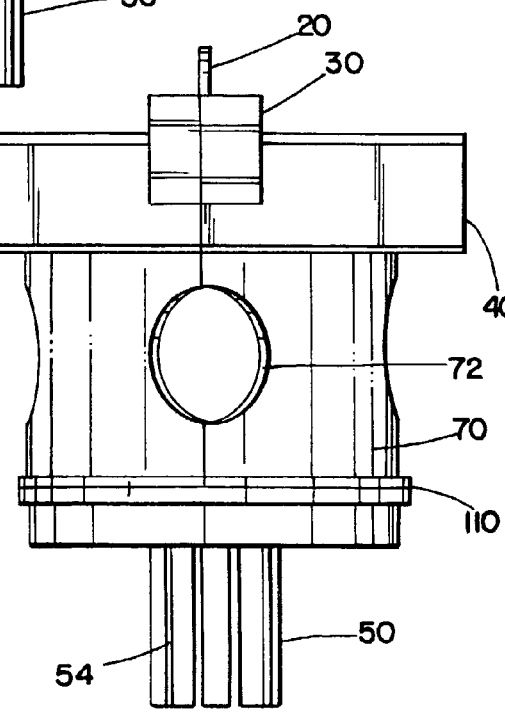
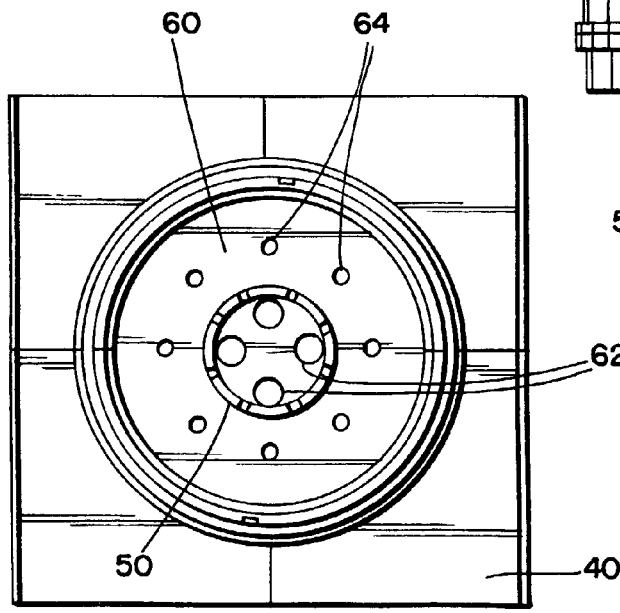
Fig. 4
Fig. 5
Fig. 6

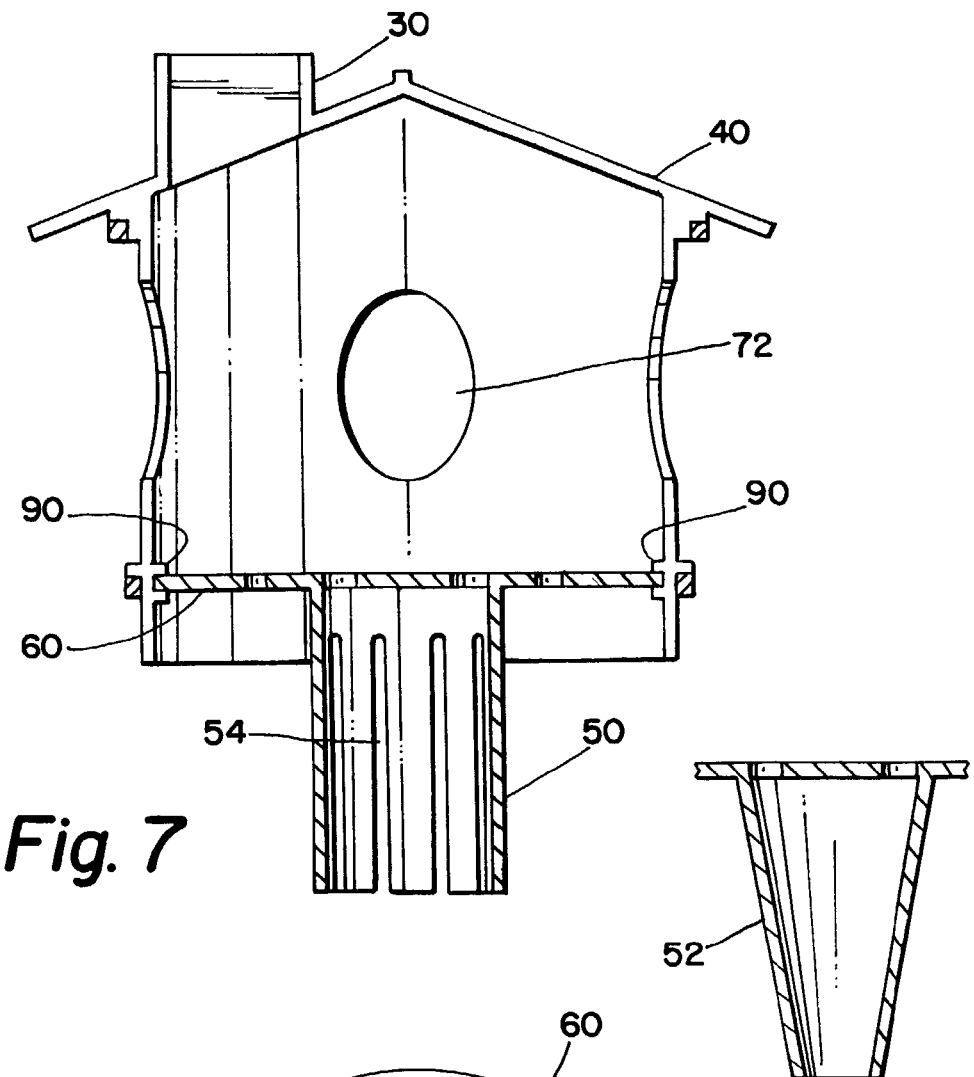
Fig. 7
Fig. 7A
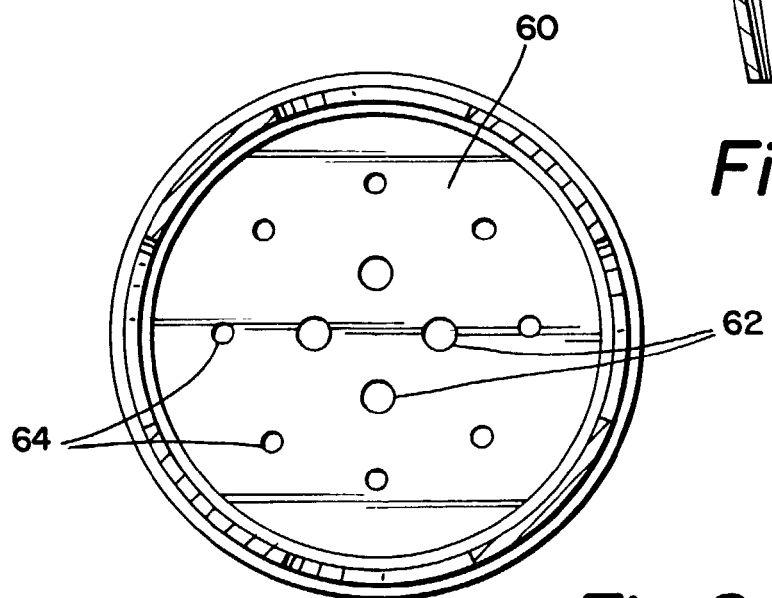
Fig. 8

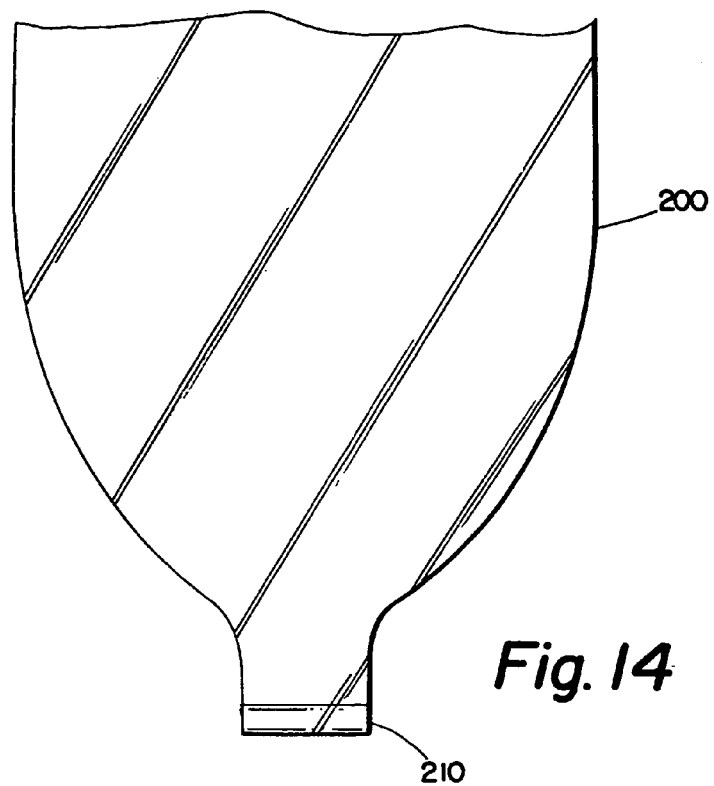
Fig. 14
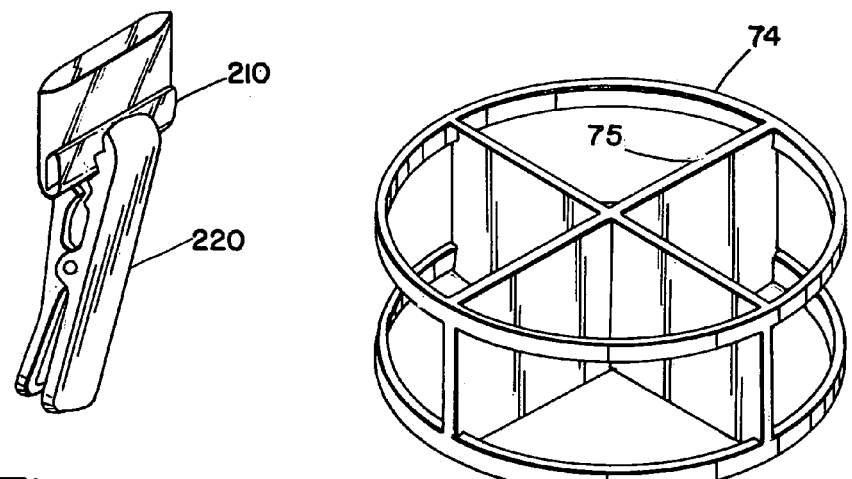
Fig. 15
Fig. 16

ARTHROPOD CONTAINMENT TRAP

FIELD OF THE INVENTION

The present invention relates to traps for the control and monitoring of arthropods.

SUMMARY OF THE INVENTION

The arthropod trap of the present invention includes a housing, an entry tube, a plate, and a containment chamber. Attracted by bait, arthropods enter the housing, and travel through the tube into the containment chamber where they are trapped. Alternatively, arthropods may directly enter through optional ports in the containment chamber. The trap can help be used to monitor, control, or simply collect arthropods of interest.

BRIEF DESCRIPTION OF THE DRAWINGS

FIG. 4 is a front view of the housing of a arthropod trap according to an embodiment of the present invention.

FIG. 5 is a back view of the housing of a arthropod trap according to an embodiment of the present invention.

FIG. 6 is a bottom view of the housing of a arthropod trap according to an embodiment of the present invention.

FIG. 7 is a cut-away front view of the housing of a arthropod trap according to an embodiment of the present invention.

FIG. 7a is a cut-away side view of an alternative embodiment of an interior tube according to the present invention.

FIG. 8 is a top cut-away view of housing according to the present invention, taken along line 8—8 of FIG. 4.

FIG. 14 is a side view of a containment bag according to a arthropod trap according to the present invention.

FIG. 15 shows the opening of the containment bag depicted in FIG. 14, with an alligator clip.

FIG. 16 is a perspective view of a central housing section according to the present invention.

DETAILED DESCRIPTION

The present invention is an arthropod trap, with a containment chamber and housing 10.

As illustrated in FIGS. 1, 2, 3, 4, 5, and 12, the housing has a hook 20 or other conventional means to hang the trap. It also has a chimney 30, for ventilation, and to provide a entry port for liquid bait. See FIGS. 1, 2, 3, 4, 5, 7, 11, and 12. An overhang 40 is also provided. See FIGS. 1, 2, 3, 4, 5, 7, 11, and 12.

Figure 17:
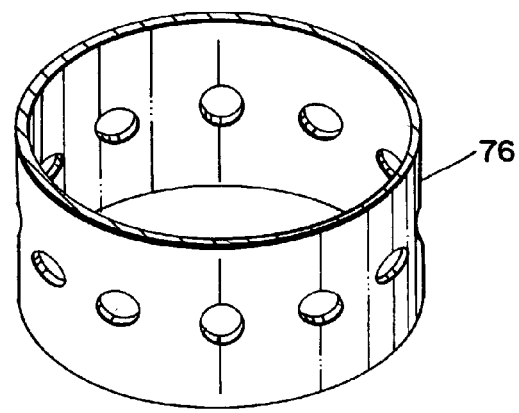
FIG. 17 is a perspective view of another central housing section according to the present invention.
Figure 18:
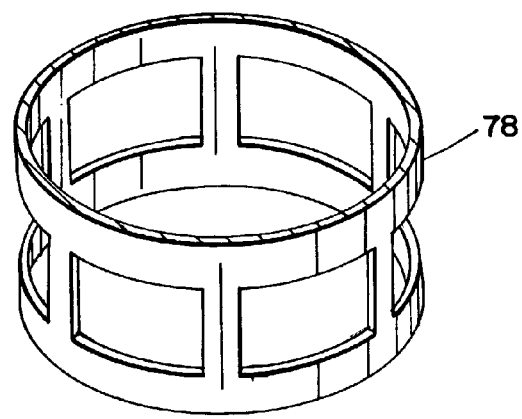
FIG. 18 is a perspective view of another central housing section according to the present invention.
Figure 19:
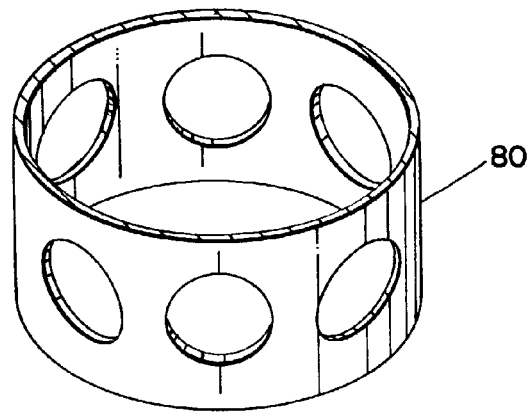
FIG. 19 is a perspective view of another central housing section according to the present invention.
Figure 20:
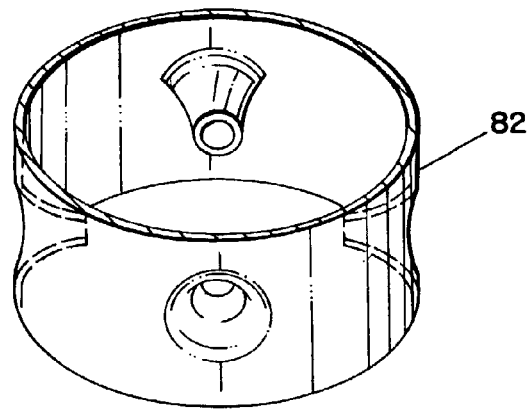
FIG. 20 is a perspective view of another central housing section according to the present invention.

The exterior of the housing contains a central housing section 70 with openings 72. See FIGS. 1, 3, 4, 5, 7, and 12. The openings 72 provide a port for entry of arthropods, and can take many forms, including four circular openings, spaced 90° apart (FIGS. 1, 3, 4, 5, 7, and 12), four large rectangular openings 74 with internal ribs (FIG. 16), a plurality of smaller circular holes 76 (FIG. 17), four large rectangular openings without internal ribs 78 (FIG. 18), a number of medium-sized openings 80 (FIG. 19), or funnel-shaped openings 82 (FIG. 20). Different opening configurations can be used to trap different arthropods.

Inside the housing is an interior tube 50, which is integrated or attached to a plate 60. See FIGS. 1, 3, 4, 5, 6, 7, 7a, 8, 11 and 12. In one embodiment, the plate 60 has two sets of holes: central holes 62, and peripheral holes 64. See FIGS. 1, 2, 3, 6, 8, 11 and 12. The peripheral holes 64 provide useful ventilation.

Figure 11:
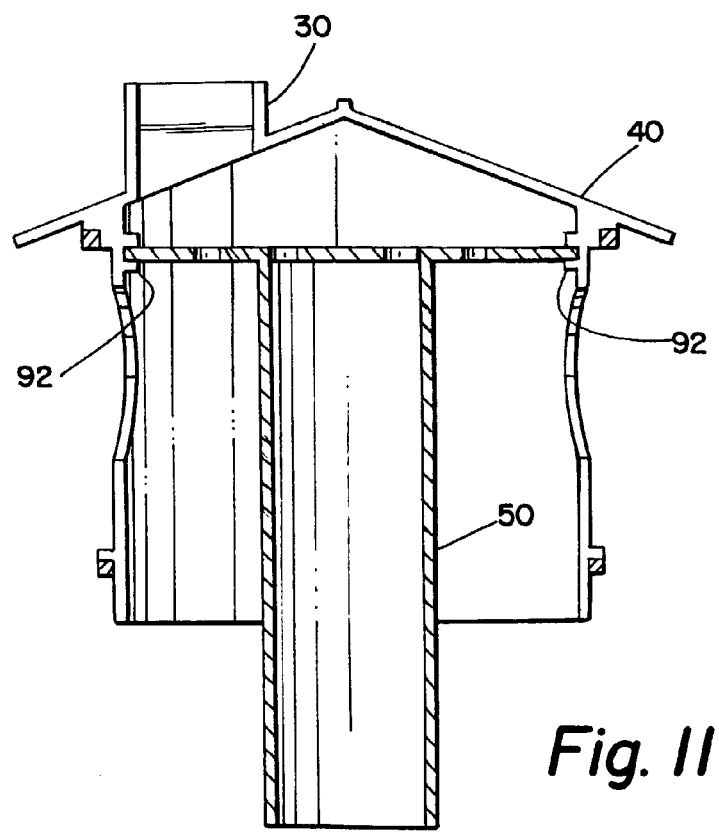
FIG. 11 is a cut-away side view of housing for a arthropod trap according to an embodiment of the present invention, with an elevated plate and interior tube.
Figure 12:
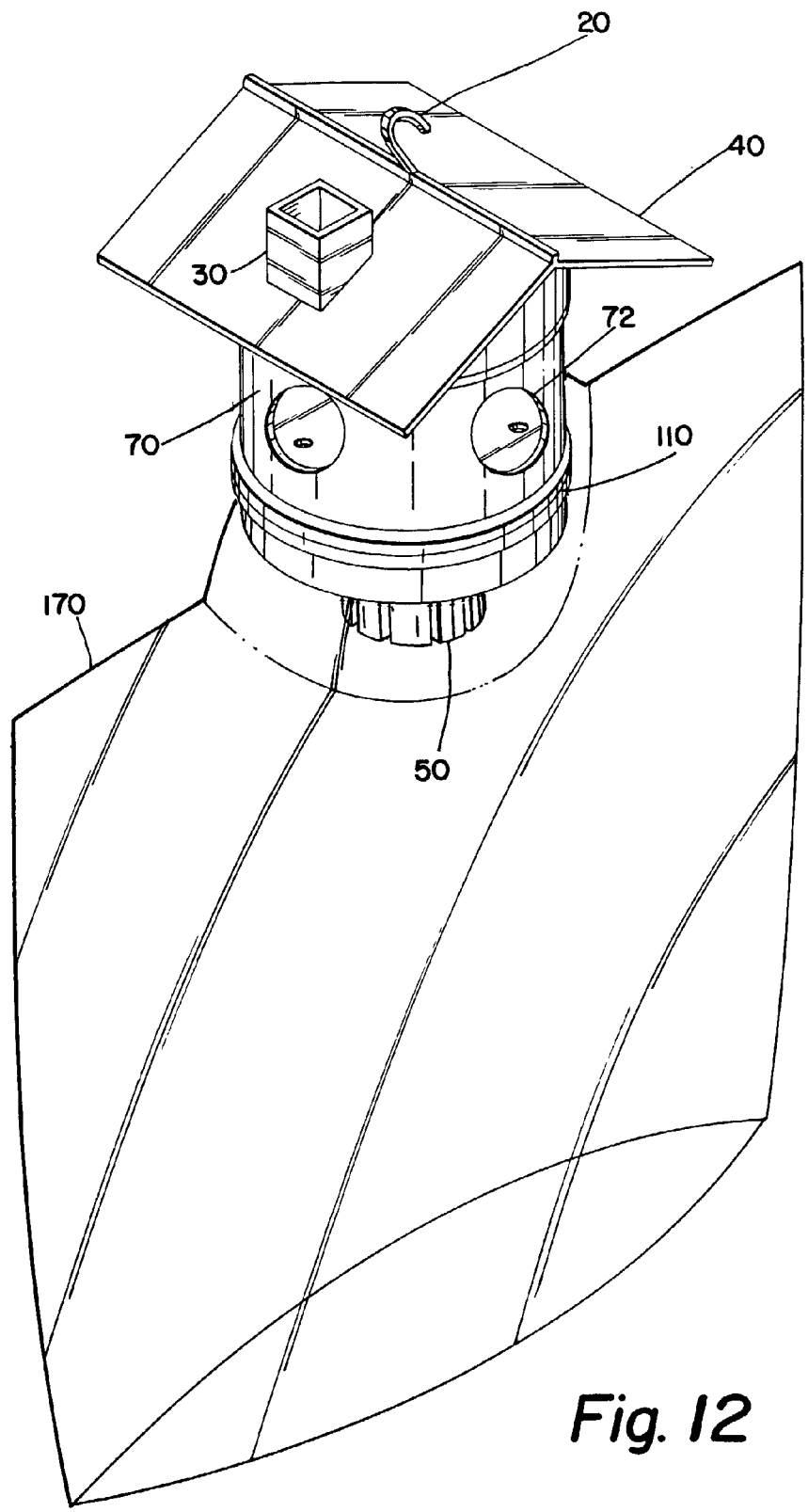
FIG. 12 is a perspective view of a arthropod trap according to an embodiment of the present invention, with a containment bag.

The plate is held inside the housing through grooved plate locks 90, as shown in FIG. 7. The plate locks 92 can also be elevated to the top of the tube, as shown in FIG. 11.

The housing 10 is connected to a containment chamber, which can be a box 130, bag 170, or other conventional chamber.

Figure 1:
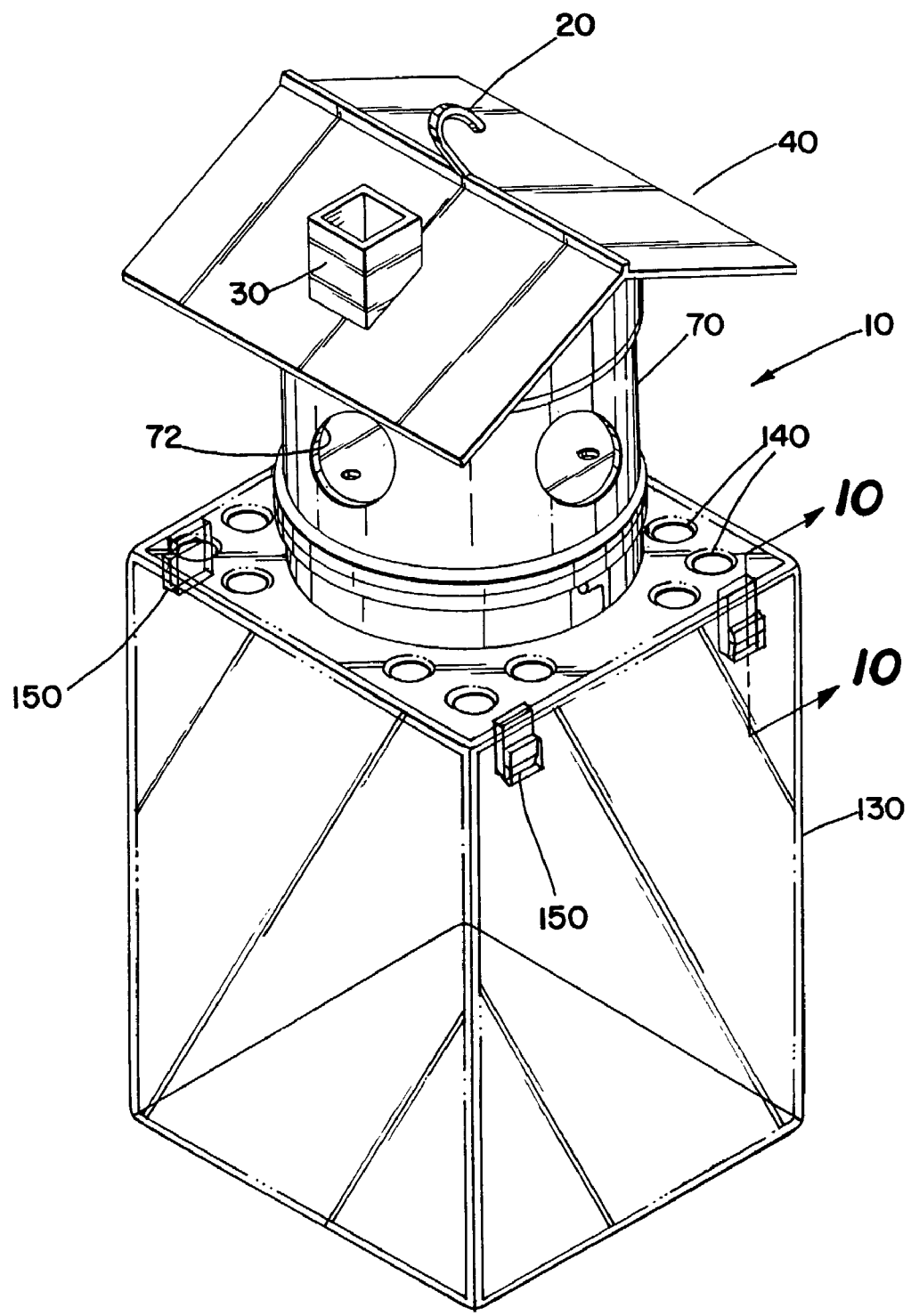
FIG. 1 is a perspective view of a arthropod trap according to an embodiment of the present invention.
Figure 2:
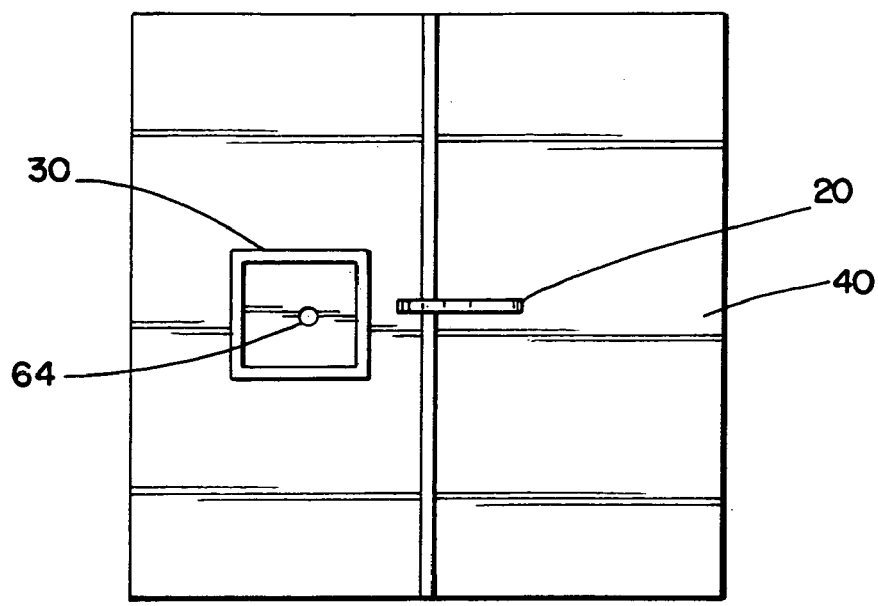
FIG. 2 is a top view of a arthropod trap according to an embodiment of the present invention.
Figure 3:
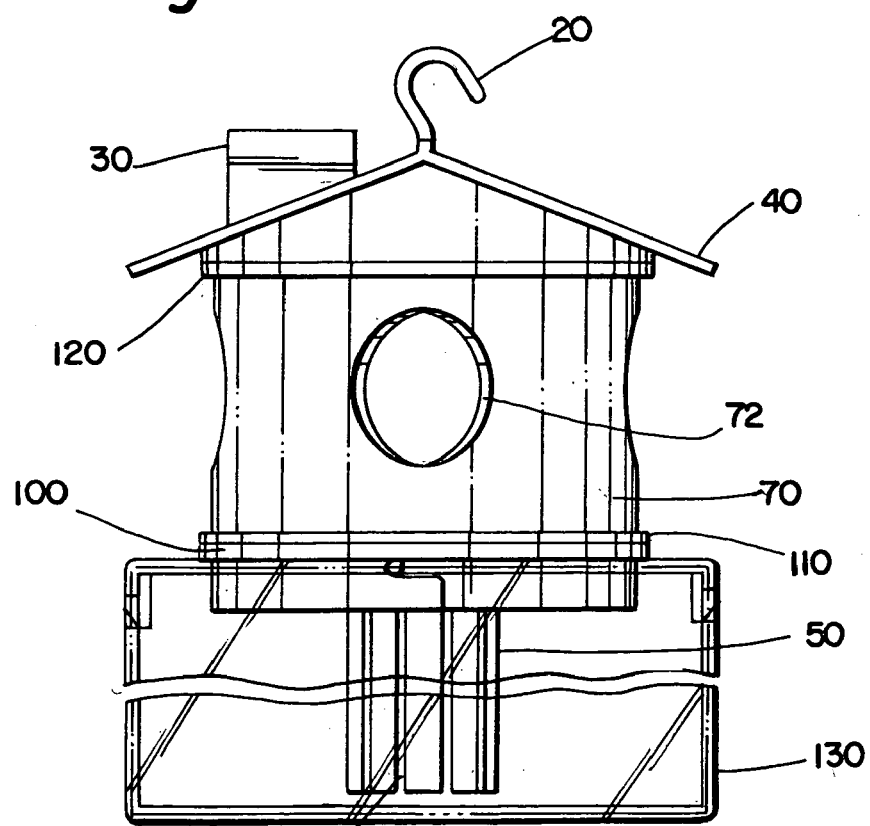
FIG. 3 is a side view of a arthropod trap according to an embodiment of the present invention.
Figure 21:
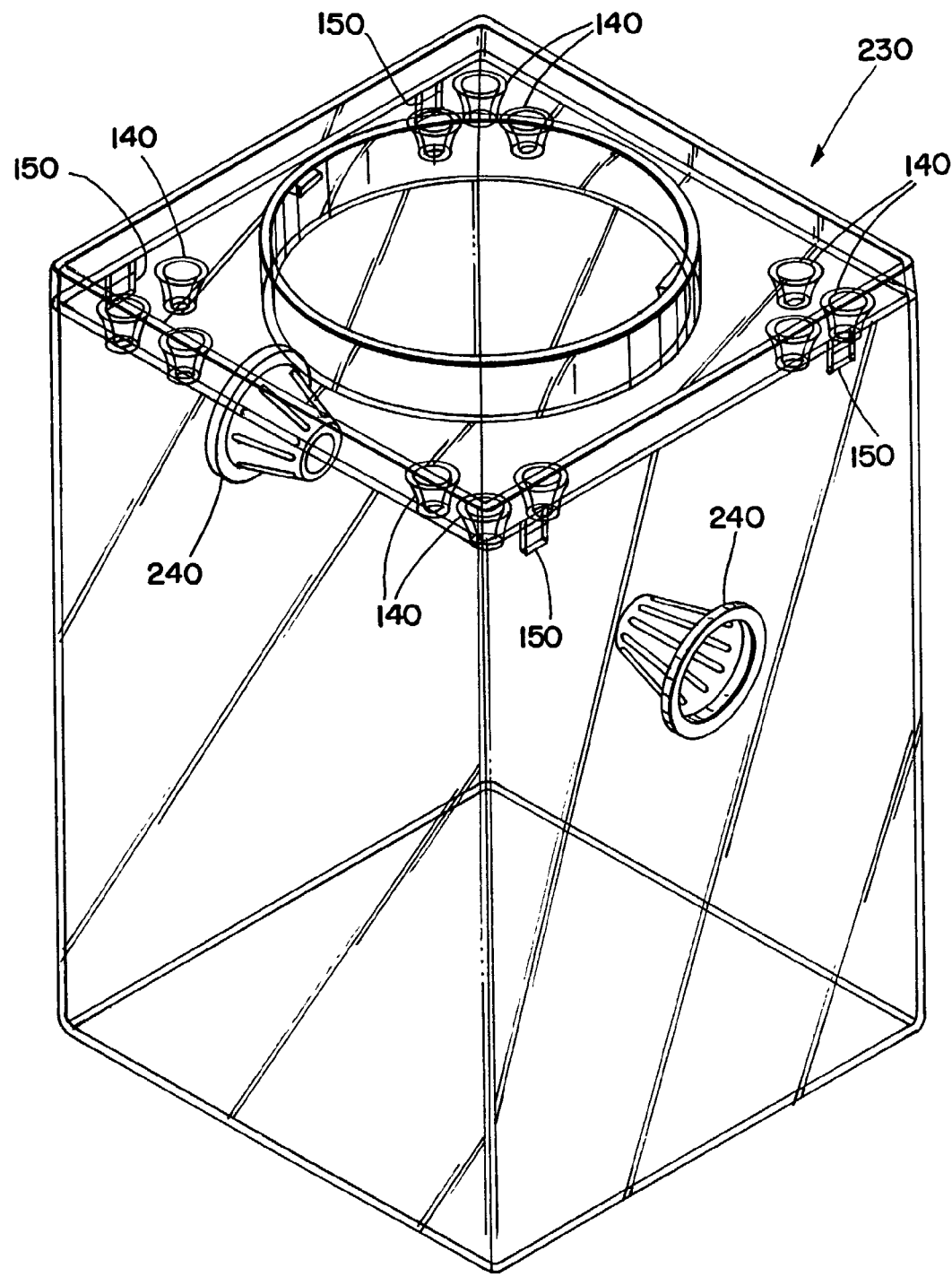
FIG. 21 is a perspective of a containment box according to the present invention.

When a box 130 is used, it may have ventilation openings 140. See FIG. 1. The ventilation openings can either be flat, as shown in FIG. 1, or tapered, as shown in FIG. 21. When tapered, the ventilation openings can also serve as entry ports directly into the chamber. The box can also have clips 150 and clip locks 170 to join the top portion of the box with the bottom portion. As shown in FIG. 21, an alternative embodiment of the box 230 also has funnel vents 240 on the side, and these vents can serve as direct entry ports into the chamber.

Instead of using a box, other rigid containers, such as a jar or glass, could also be used.

Figure 9:
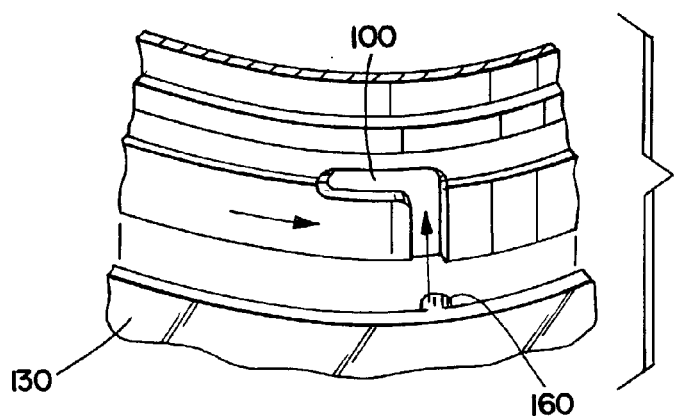
FIG. 9 shows the receptacle lock notch in the housing of a arthropod trap according to an embodiment of the present invention, along with the portion of the containment box containing the housing lock.
Figure 10:
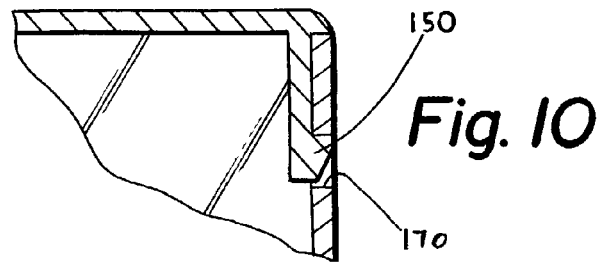
FIG. 10 is a cut-away side view of a portion of a containment box showing a locking clip, taken along line 10—10 of FIG. 1.

The box 130 or other rigid container can be attached to the housing 10 through a lock notch 100 in the bottom exterior surface of the housing and a housing lock 160 in the box. See FIG. 9.

Figure 13:
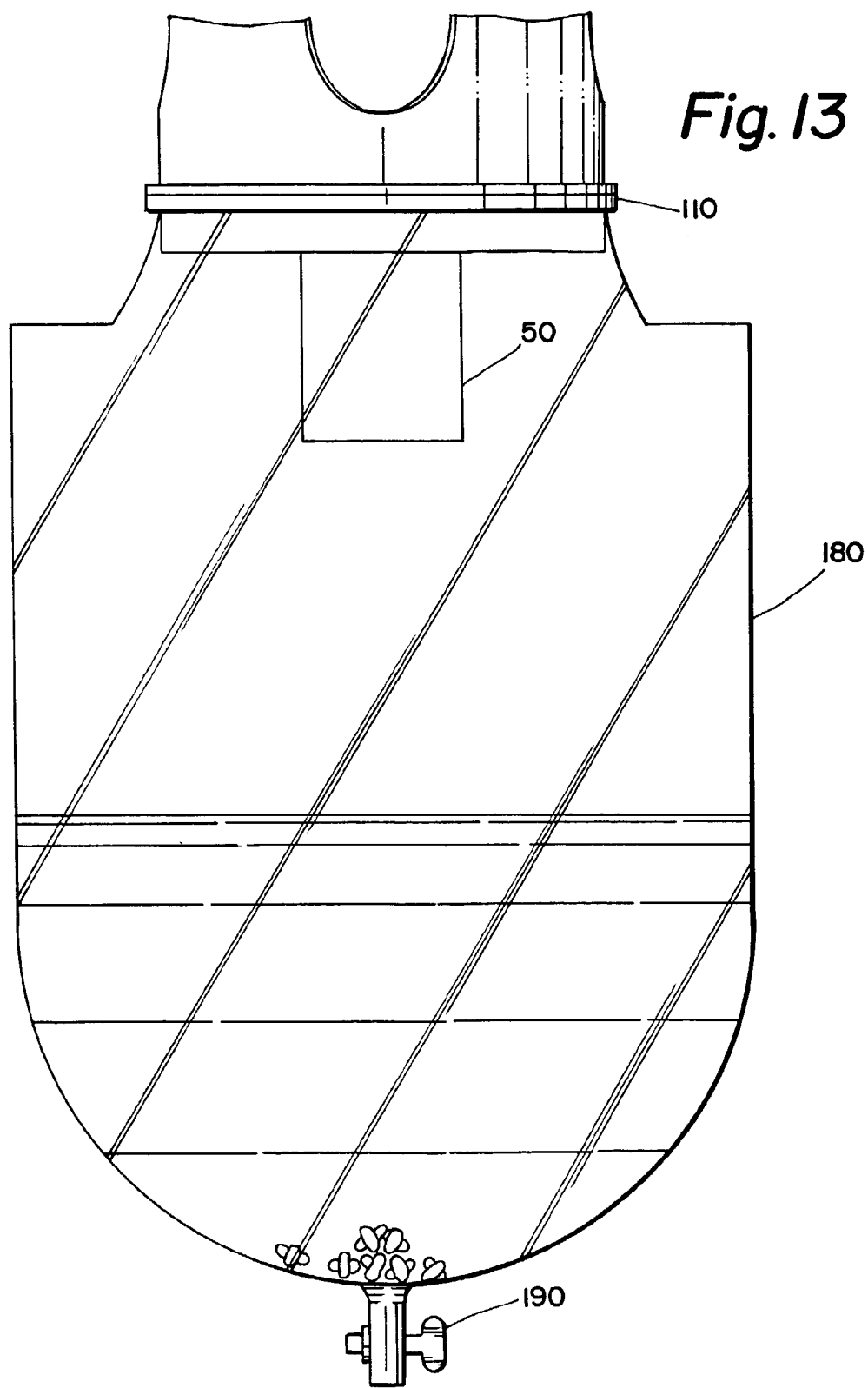
FIG. 13 is a side view of a containment bag with a dispensing cock according to a arthropod trap of the present invention.

Various forms of bags can be used. In one embodiment, a bag 170 with no bottom openings can be used. See FIG. 12. Such a bag can be gusseted so that it will stand up on its own. Other embodiments can be employed if users want to tally the number of trapped arthropods. If liquid bait is used, a bag 180 can be fitted with a dispensing cock 190 or other dispenser and the dead arthropods can be counted as the bait is emptied through the dispenser. See FIG. 13. Alternatively, when dry bait is used, a bag 200 with an opening 210 at the end can be employed. See FIG. 14. When this bag is used, an alligator clip 220 or other conventional means can be used to be close the opening. See FIG. 15. To count the arthropods, the user could remove the clip and shake the arthropods out, counting them as they fall, or storing them for further identification and tallying.

The trap according to the present invention can be re-usable or disposable. A box is generally (but not exclusively) used for re-usable traps, and a bag is generally (but not exclusively) used for disposable purposes.

In operation, bait can be placed in the containment chamber. The present invention can work with many different kinds of bait. If liquid bait is used, it can be poured through the ventilation chimney 30.

The housing 10 can be constructed of plastic or other suitable materials.

The present invention can be used to trap many urban and rural arthropods, including but not limited to wasps, flies, yellow jackets, fruit flies, house flies, roaches, crickets, and beetles. It can be used to control populations of such arthropods, or to monitor arthropod populations, or simply to collect arthropods of interest. When used as a monitoring or control device, the trapped arthropod will typically die inside the containment chamber. Thus used, the trap can help determine the presence and distribution of arthropods of interest. The device can also be used to collect but not kill arthropods, in which case the insects can be given access to food, and can be harvested from the containment chamber for scientific study.

One skilled in the art will appreciate that the present invention can be practiced by other than the preferred embodiments, which are presented for purposes of illustration and not of limitation.

We claim:

1. An arthropod trap, comprising:
    a housing, said housing having an exterior surface, an interior area, and a top portion, said exterior surface defining an external opening;
    a chimney and an overhang in said top portion of said housing;
    a plate in said interior area of said housing, an arthropod containment chamber below said plate;
    said arthropod containment chamber further comprising attractant and a port of entry for arthropods;
    a tube descending from said plate into said arthropod containment chamber;
    wherein said arthropods are drawn into said arthropod containment chamber by said attractant.

2. The arthropod trap according to claim 1, wherein said containment chamber is a bag.

3. The arthropod trap according to claim 2, wherein said bag is gusseted.

4. The arthropod trap according to claim 2, wherein said bag has a bottom, and said bag has an opening at its bottom for removal of trapped arthropods.

5. The arthropod trap according to claim 4, wherein said bag opening has means for incrementally dispensing liquid from said bag.

6. The arthropod trap according to claim 4, additionally comprising means for closing said bag opening.

7. The arthropod trap according to claim 1, wherein said means for closing said bag opening is an alligator clip.

8. The arthropod trap according to claim 1, wherein said containment chamber is a rigid container.

9. The arthropod trap according to claim 8, wherein said rigid container is a box.

10. The arthropod trap according to claim 9, wherein said box has a housing lock.

11. The arthropod trap according to claim 8, wherein said rigid container has at least one side, and wherein said side comprises a planer surface and a funnel vent integral with said planar surface.

12. The arthropod trap according to claim 8, wherein said rigid container has a top surface, and wherein said top surface comprises a tapered entry port.

13. The arthropod trap according to claim 1, wherein said external surface defines an additional external opening.

14. The arthropod trap according to claim 13, wherein said external openings are circular in shape.

15. The arthropod trap according to claim 13, wherein said external openings are rectangular in shape.

16. The arthropod trap according to claim 15, additionally comprising internal ribs within said housing.

17. The arthropod trap according to claim 13, wherein said external openings are funnel-shaped.

18. The arthropod trap according to claim 1, additionally comprising means disposed on said top portion for hanging said trap.

19. The arthropod trap according to claim 18, wherein said means for hanging said trap is a hook.

20. An arthropod trap, comprising:
    a housing, said housing having an exterior surface, an interior area, and a top portion;
    external openings in said exterior surface;
    a chimney and an overhang in said top portion;
    a plate in said interior area;
    an arthropod containment chamber below said plate;
    said arthropod containment chamber further comprising food not lethal to arthropods and a port of entry for said arthropods whereby said arthropods are attracted to and not killed by ingestion of said food; and
    a funnel descending from said plate into said arthropod containment chamber.

21. The method for trapping arthropods comprising:
    providing:
        a housing, said housing having an exterior surface and an interior area;
        external openings in said exterior surface;
        a plate in said interior area, a containment chamber below said plate;
        said containment chamber further comprising arthropod food non-lethal to arthropods and a port of entry for arthropods; and
        a tube descending from said plate into said containment chambers;
    attracting said arthropods to said containment chamber with said food; and
    trapping said arthropods in said containment chamber.

* * * * *